Aug. 26, 1930.  C. F. McKINNEY  1,773,921
FLYING APPARATUS
Original Filed Aug. 18, 1927   2 Sheets-Sheet 1
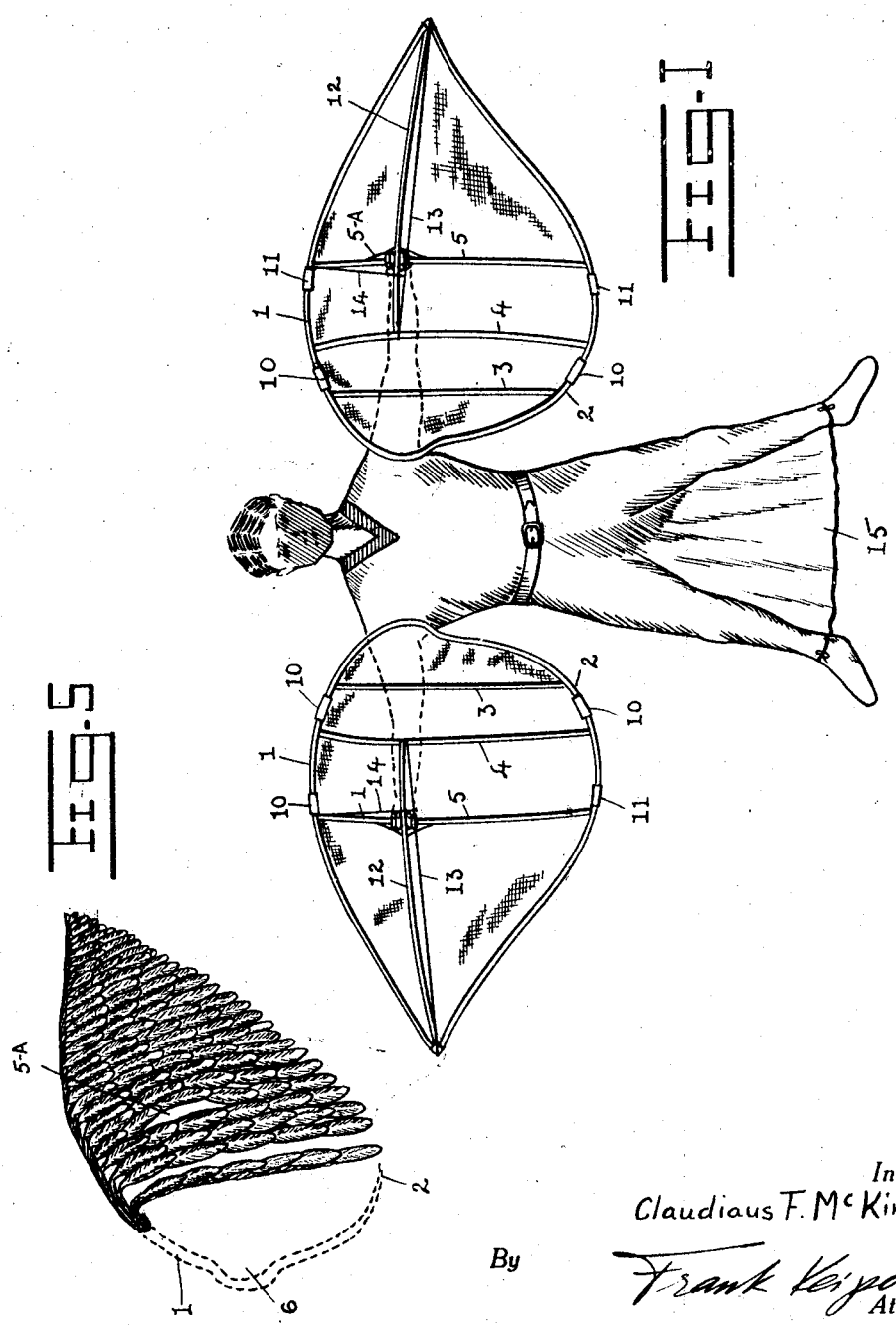
Inventor
Claudiaus F. McKinney
By Frank Keiper
Attorney Aug. 26, 1930.  C. F. McKINNEY  1,773,921
FLYING APPARATUS
Original Filed Aug. 18, 1927   2 Sheets-Sheet 2
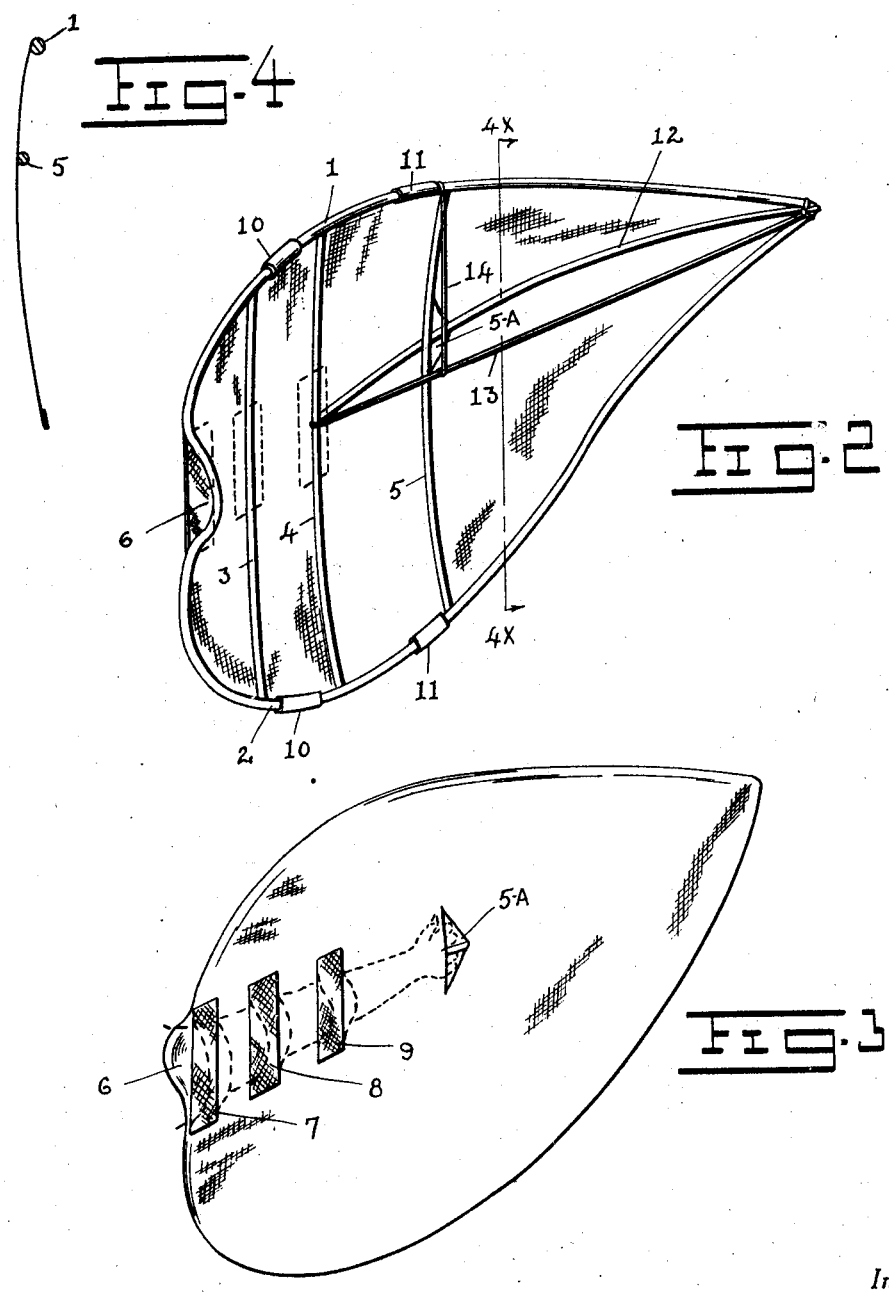
Inventor
Claudiaus F. McKinney
By Frank Keipos
Attorney Patented Aug. 26, 1930

1,773,921

UNITED STATES PATENT OFFICE

CLAUDIAUS F. McKINNEY, OF ROCHESTER, NEW YORK

FLYING APPARATUS

Application filed August 18, 1927, Serial No. 213,955. Renewed November 26, 1929.

The object of this invention is to provide an improved form and construction for wing members so that such wing members can be held to the body and operated by the arms of a person.

These and other objects of this invention will be fully illustrated in the drawings, described in the specification and set forth in the claims at the end thereof.

In the accompanying drawings:

Figure 1 is a front elevation of a pair of the wing members as they appear when held in place on the body of a person.

Figure 2 is a detail perspective view of one of the wing members as viewed from one side thereof.

Figure 3 is a detail perspective view of the other of the wing members as viewed from the other side thereof.

Figure 4 is a cross section of one of the wing members the section being taken on the line 4ˣ—4ˣ of Figure 2.

Figure 5 is a detail perspective view of the wing member as it appears when made up of feathers.

In the several figures of the drawings like reference numerals indicate like parts.

The wing members and their construction forming the subject matter of this invention are improvements over other wing members that have heretofore been constructed and the construction of the improved wing members is such that they resemble as closely as possible the construction of the wings of birds so as to permit the operation of them as nearly as practical to those of a bird.

As illustrated in the several figures of the drawings each wing member has practically the outline and shape of the wing of a bird being convex at the top and concave at the bottom. A heavy reinforcing or supporting rib 1 extends from the lower inner end of each wing from approximately the point marked 2 along the inner end and over the top edge of the wing to the outer pointed end thereof. This rib 1 is the main support for the wing and may be made of suitable light material having the necessary strength such as wood, metal tubing, etc. but preferably the rib is made up of a series of feather quilts that are suitably fastened together into the form of a flexible but strong rib with the feather ends of the quilts projecting to one side and forming parts of the cover of the wing member. The latter construction is illustrated in Figure 5. In this construction the remainder of the cover for the wing member is made up of more feathers that are suitably attached and form continuations of one another and the feathers forming part of the rib member 1. In this construction the cover of the wing gradually tapers from the heavy rib at the front to a feather edge at the back and outer end which makes the wing member practically an imitation of a bird's wing.

Besides the main supporting rib 1 other cross ribs 3, 4 and 5 may be provided in each of the wing members. These cross ribs extend from the main rib 1 at the front edge of the wing to the rear or feather edge of the wing members. In the construction illustrated in Figures 1 to 4 the cross ribs 3, 4 and 5 are made of the same material as the main supporting rib 1. These cross ribs serve to hold the wing member in shape and provide means to which the covering of the wing can be attached. The last of these cross ribs also serves as a handle that can be engaged by the hand as illustrated in Figures 1 and 3. For this purpose the wing covering is cut away at a suitable point 5A alongside the cross rib 5 so that when the arm is placed on top of the wing as will hereinafter be described the fingers of the hand can engage thru the opening in the wing covering and firmly grasp the cross rib.

As illustrated in the figures each of the wing members is provided with a practically semi-circular depression 6 at the inner end of the wing. This depression forms the pivot socket for the wing member and the arm is placed over the wing member in a manner that will locate the depression in the arm pit and will make the portion of the supporting rib forming the edge of the depression partially encircle the arm below the shoulder thereof. This not only locates the wing member in the proper position with relation to the arm, but it also forms a pivotal socket support that makes it easy for the wing member to be rocked by the arm.

The depression 6 is supplemented with a series of straps 7, 8 and 9 that are suitably fastened to the inner end of the top of the wing in line with the depression 6. These straps and the engagement of the hand with the cross member 5 thru the opening 5A serve to hold the arm firmly in place on top of the wing member from the shoulder to the fingers so that any movement of the arm operates to give the wing member a corresponding warping movement.

In the feather construction illustrated in Figure 5 the movement or warping of the wing member is made possible by the flexibility of the supporting rib. On the construction illustrated in Figures 1 to 4 the flexibility is provided by the flexible joints 10 and 11. These joints are made up of flexible material such as rubber tubing etc. which connect the different sections of the supporting rib. The flexible joints 10 and 11 correspond to the joint in the elbow and wrist of the arm so that when one or the other or both are moved by the muscles of the arm the wing member attached to this arm is warped correspondingly. This warping of the wing members together with the ability to turn the wing with the arm forming the pivotal axis makes it possible to manipulate each wing member in a natural and easy manner.

In order to give the wings more stability the cross members may be supplemented by one or more longitudinal bracing members 12. If necessary the wing member may also be held in shape by wires 13 and 14 that are stretched on the under side of the wing member between suitable points to give the wing member the proper curvature.

A wing member is provided for each arm and this is supplemented by a tail member 15. This tail member is made up in the form of a pair of trousers which have their trouser legs connected by a piece of flexible sheet material so that when the legs are spread apart the space between the legs is covered by the sheet material and forms the tail member proper. The outer ends of the tail member are suitably tied to the ankles of the feet in order to hold the tail member extended at all times.

The trousers may form part of a tight fitting suit made of silk and if desired be covered with feathers so that both the body, tail and the wing members are completely covered with feathers.

While I have shown the arms exposed on top of the wing members it is readily understood that in the construction of the wing members in which feathers are used, the arms may be covered by the feathers or completely embedded therein.

I claim:

1. A wing structure comprising a supporting rib, flexible joints in said supporting rib at predetermined points of the rib, a wing cover supported by said rib, a semi-circular socket formed at the inner end of said wing structure, and adapted to partially encircle an arm under the arm pits, means for holding the arm in place in said semi-circular socket and allow said wing structure to turn with the arm as its axis.

2. A flying apparatus comprising a pair of wings adapted to be held in place one by each arm of a person, each wing being adapted to engage under an arm pit, means provided on each of said wings to allow said wings to be turned axially with the arms and means provided on each of said wings to allow said wings to be warped corresponding to the movement of the arm or any part thereof, and a tail member attached to and supported by the legs of the person carrying the pair of wing members.

3. A wing structure comprising a supporting rib, a cover supported by said supporting rib, said rib extending around the margin of the cover and being attached thereto, a pivoting socket formed at the inner end of the structure and adapted to engage under an arm pit, ribs extending across said cover and attached to the rib on the margin of the cover, straps attached to said cover in line with said cross ribs, said straps being adapted to hold an arm in place in said pivot socket to allow the arms to turn the wing structure with the arm forming the pivot for the turning movement.

4. A wing structure comprising a supporting rib, flexible joints in said supporting rib, a cover attached to said supporting rib, straps attached to said cover between which and the cover an arm can be engaged, said strap serving to clamp an arm in place on said wing with the wing engaging under the arm pit, said cover and said straps being provided to allow said supporting rib and said cover to be bent at said joints on the movement of the wrist and elbow of the arm and warp the wing structure to any position of the arm.

In testimony whereof I affix my signature.

CLAUDIAUS F. McKINNEY.